US 11,005,340 B2

(12) United States Patent
Airoldi

(10) Patent No.: US 11,005,340 B2
(45) Date of Patent: May 11, 2021

(54) ELECTRIC GENERATOR COOLING METHOD

(71) Applicant: Siemens Gamesa Renewable Energy A/S, Brande (DK)

(72) Inventor: Giovanni Airoldi, Aarhus (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 471 days.

(21) Appl. No.: 16/073,907

(22) PCT Filed: Jan. 16, 2017

(86) PCT No.: PCT/EP2017/050757
§ 371 (c)(1),
(2) Date: Jul. 30, 2018

(87) PCT Pub. No.: WO2017/133884
PCT Pub. Date: Aug. 10, 2017

(65) Prior Publication Data
US 2019/0044414 A1 Feb. 7, 2019

(30) Foreign Application Priority Data

Feb. 2, 2016 (EP) .................................. 16153841

(51) Int. Cl.
*H02K 9/04* (2006.01)
*H02K 11/25* (2016.01)
(Continued)

(52) U.S. Cl.
CPC .................. *H02K 9/04* (2013.01); *F03D 9/25* (2016.05); *F03D 17/00* (2016.05); *F03D 80/60* (2016.05);
(Continued)

(58) Field of Classification Search
CPC ............ H02K 7/00; H02K 7/18; H02K 7/183; H02K 7/1838; H02K 9/00; H02K 9/04;
(Continued)

(56) References Cited

U.S. PATENT DOCUMENTS

2005/0285457 A1* 12/2005 Tsutsui .................. H02K 11/25
310/54
2010/0237727 A1* 9/2010 Mantere .................. H02K 9/10
310/64
(Continued)

FOREIGN PATENT DOCUMENTS

CN       201608593       10/2010
CN       201608593 U     10/2010
(Continued)

OTHER PUBLICATIONS

International Search Report for PCT/EP2017/050757.
International Search Report; dated Feb. 23, 2017; International Application No. PCT/EP2017/050757; 3 pages.

*Primary Examiner* — Tran N Nguyen
(74) *Attorney, Agent, or Firm* — Schmeiser, Olsen & Watts LLP

(57) ABSTRACT

Provided is a method for cooling an electric generator including the steps of: monitoring the temperature of the end winding and of the magnet through said first and second temperature sensors, if the temperatures of the end winding and/or of the magnet rises and reaches a first upper limit, operating the plurality of cooling fans for providing a first cooling power to the electric generator, if, while the first cooling power is provided, the temperature of the magnet reaches the second maximum acceptable temperature and the temperature of the end winding is lower than the first maximum acceptable temperature, operating the plurality of cooling fans for providing a second cooling power to the electric generator, the second cooling power being lower than the first cooling power.

6 Claims, 2 Drawing Sheets

Figure 1:
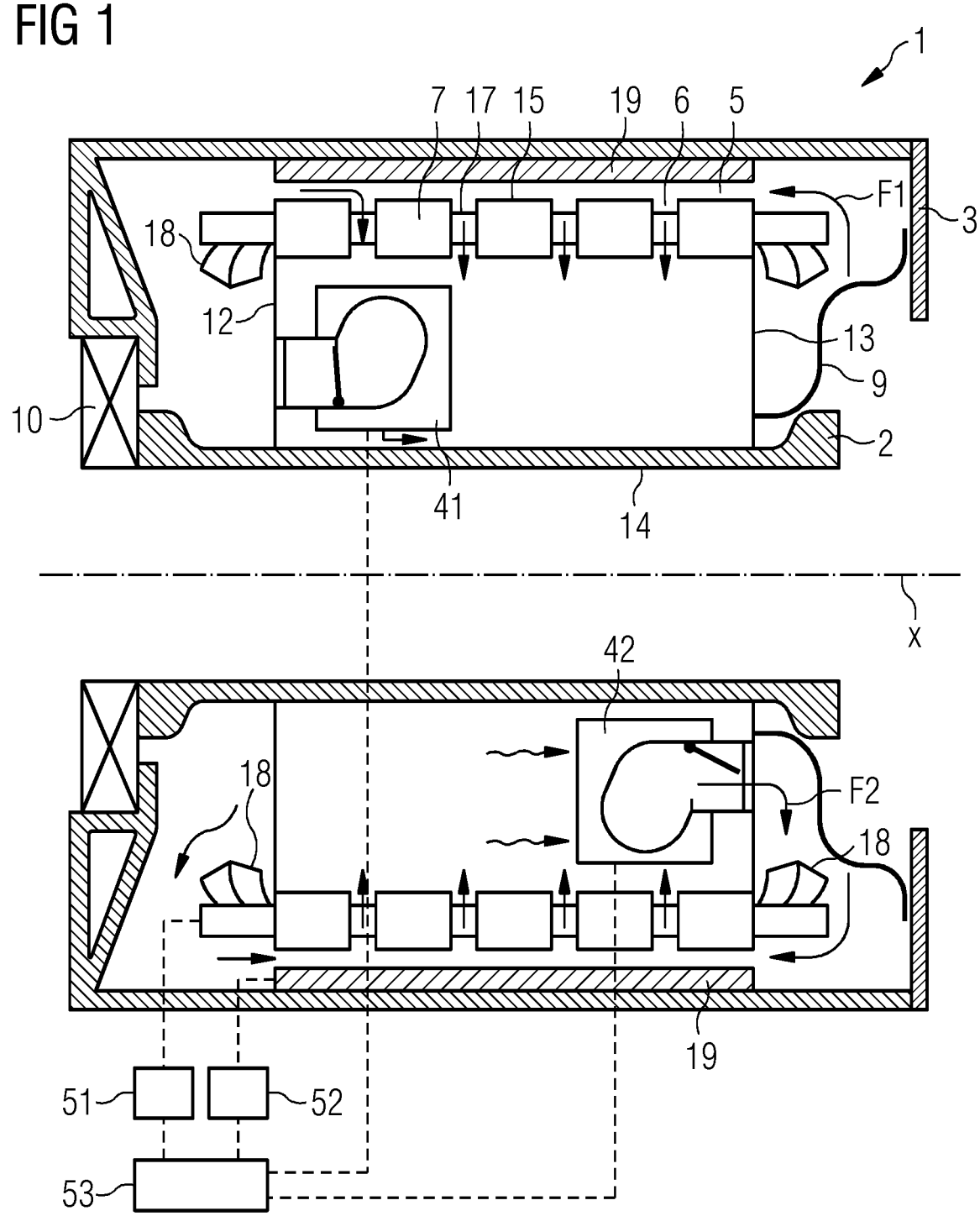

(51) Int. Cl.
*H02K 9/08* (2006.01)
*H02K 11/30* (2016.01)
*F03D 9/25* (2016.01)
*F03D 17/00* (2016.01)
*F03D 80/60* (2016.01)
*H02K 7/18* (2006.01)

(52) U.S. Cl.
CPC ............... *H02K 7/183* (2013.01); *H02K 9/08* (2013.01); *H02K 11/25* (2016.01); *H02K 11/30* (2016.01); *F05B 2220/7068* (2013.01); *H02K 7/1838* (2013.01); *H02K 2213/09* (2013.01)

(58) Field of Classification Search
CPC .. H02K 9/08; H02K 9/10; H02K 9/12; H02K 9/18; H02K 11/00; H02K 11/25; H02K 11/30; H02K 15/00; H02K 15/0006
See application file for complete search history.

(56) References Cited

U.S. PATENT DOCUMENTS

| | | |
|---|---|---|
| 2013/0249333 A1* | 9/2013 | De Graaff ............... H02K 9/12 310/59 |
| 2013/0342049 A1 | 12/2013 | Stridsberg |
| 2015/0303860 A1 | 10/2015 | Imanishi et al. |
| 2015/0372565 A1 | 12/2015 | Airoldi et al. |

FOREIGN PATENT DOCUMENTS

| | | |
|---|---|---|
| EP | 2757666 A1 | 7/2014 |
| EP | 2899858 A1 | 7/2015 |
| EP | 2928050 A1 | 10/2015 |
| EP | 2958217 A1 | 12/2015 |
| JP | H0956118 A | 2/1997 |
| JP | 2000166177 A | 6/2000 |
| WO | 2012121643 A1 | 9/2012 |
| WO | WO 2012121643 A1 | 9/2012 |

* cited by examiner

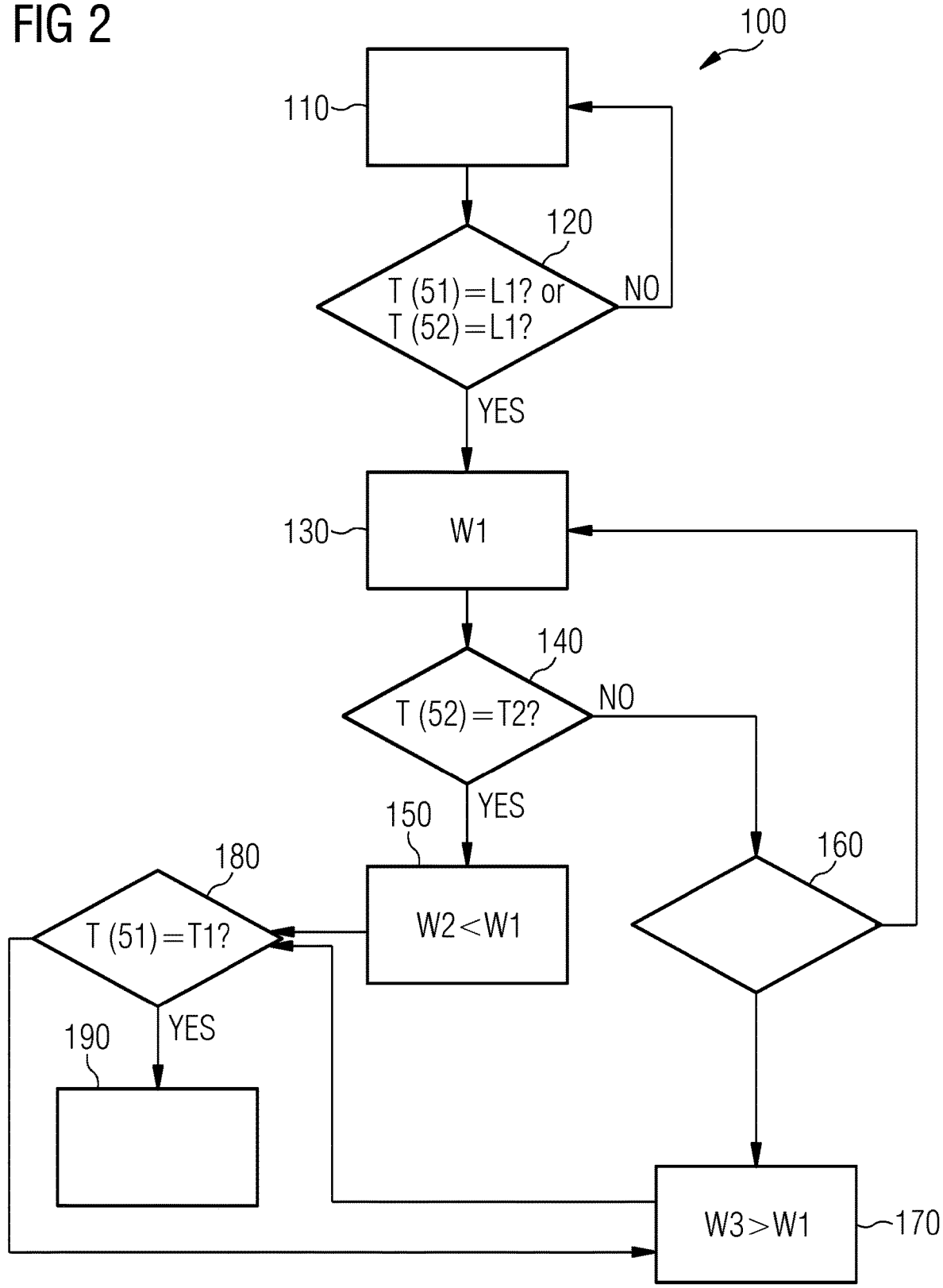

ELECTRIC GENERATOR COOLING METHOD

CROSS-REFERENCE TO RELATED APPLICATIONS

This application claims priority to PCT Application No. PCT/EP2017/050757, having a filing date of Jan. 16, 2017, based on European Application No. 16153841.8, having a filing date of Feb. 2, 2016, the entire contents both of which are hereby incorporated by reference.

FIELD OF TECHNOLOGY

The following relates to a method for cooling an electric generator, comprising a stator, a rotor and a plurality of cooling fans. In particular, the method of embodiments of the present invention applies to electric generator included in wind turbines.

BACKGROUND

Electric generator of the kind above and cooling methods thereto are generally known. By means of the fans, air is blown through the rotor stator gap and the stator air ducts to cool the generator, in particular the end windings of the stator and the permanent magnets of the rotor.

During operation the machine is monitored and a control strategy is in place to maximize the power production. The end winding temperatures are measured to control the fans used for cooling. When the temperature reaches a first predefined upper limit value, two strategies are normally possible:

in the so-called Large Drive (LD) generators a portion of a plurality fans which are installed are switched on, in the so-called Small Drive (SD) generators, all the fans of a plurality fans which are installed are switched on at Low speed.

When the temperature reaches a second predefined upper limit value, higher than the first upper limit, the two strategies respectively comprises:

LD generators: switching on further fans of the plurality fans which are installed;

SD generators: running the fans at a higher speed.

In addition to measuring the end winding temperatures, also the generator current and the rotor permanent magnet temperatures are measured. When the latter also reach a certain predefined upper limit values, the control strategy currently in place reduces the power production in order to be able to maintain the end winding temperatures and the magnets below their maximum acceptable temperatures. The maximum acceptable temperature on the windings depends on the insulation class and the maximum acceptable temperature on the magnets on the percentage of alloy element preventing demagnetization. Typically, maximum acceptable temperature on the winding is higher than the maximum acceptable temperature on the magnets.

In this condition, when the electrical generator is derated, all the cooling fans are running (LD generators) or they are running at full speed (SD generators) because they are controlled by the maximum end winding temperature, which has reached the above defined second upper limit.

There are, however, situations where the cooling air circulated in the generator has a temperature comprised between the maximum acceptable temperature of the permanent magnets and the maximum acceptable temperature of the end windings. In these cases, temperatures of the end windings may be well below their limit and the permanent magnet temperature becomes the limiting factor because the circulated air which is cooling the stator tends also to heat up the permanent magnets.

Typically, this happens at low torque, hence low current and high ambient temperature, but it may also happen at full power.

SUMMARY

An aspect relates to a method for cooling an electric generator is provided. The electric generator comprises:

a stator including a plurality of windings and at least an end winding associated to a first temperature sensor, the end winding being operatable up to a first maximum acceptable temperature, a rotor including at least a magnet associated to a second temperature sensor, the magnet being operatable up to a second maximum acceptable temperature, one or more cooling fans, which in their active state generate air flows through the electric generator, for cooling the end winding and the magnet.

The method includes the steps of:

monitoring the temperatures of the end winding and of the magnet through said first and second temperature sensors, if the temperature of the end winding and/or of the magnet rises and reaches a first upper limit, operating the plurality of cooling fans for providing a first cooling power to the electric generator, if, while the first cooling power is provided, the temperature of the magnet reaches the second maximum acceptable temperature and the temperature of the end winding is lower than the first maximum acceptable temperature, operating the plurality of cooling fans for providing a second cooling power to the electric generator, the second cooling power being lower than the first cooling power.

According to a second aspect of embodiments of the invention, a control unit for an electric generator is provided. The control unit includes program or product for executing the method above described, when the software program or product is run on the control unit.

Advantageously, according to embodiments of the present invention, the magnet temperature is added to the cooling control of the end windings and of the magnets themselves. In this way, a lower air flow allows the magnet temperature to decrease, hence allowing more power to be produced, at least until a limit is reached for the temperature of the end windings. This typically happens at low torque (in the rotor), low current (in the electric generator) and high ambient temperature, but it could also happen at full electrical power. It is hence theoretically possible to find the number of fans or the fans speed which allow reaching at same time both the maximum acceptable temperature for the end windings and for the magnets, thus maximizing the power produced by the electric generator.

According to a further embodiment of the invention, the method comprises the further step of:

if, while the first cooling power is provided, the temperatures of the end winding and/or of the magnet continue to rise and are both lower than the first and second maximum acceptable temperatures, respectively, operating the plurality of cooling fans for providing a third cooling power to the electric generator, the third cooling power being higher than the first cooling power.

Advantageously, if both the maximum acceptable temperatures have not been reached yet, this allows raising the cooling power without derating the electric generator.

According to a further embodiment of the invention, the method comprises the further step of:

if the temperature of the end winding reaches the first maximum acceptable temperature, derating the electric generator.

Advantageously, the derating the electric generator allows the cooling both the end windings and the magnets, when the cooling power generated by the cooling fan is no more effective.

According to a further embodiment of the invention, the plurality of cooling fans are operated for generating the first cooling power, the second cooling power and the third cooling power, by switching on/off a portion of the plurality of cooling fans.

Advantageously, this embodiment may be applied to Large Drive (LD) generators.

According to yet another embodiment of the invention, the plurality of cooling fans are operated for generating the first cooling power, the second cooling power and the third cooling power, by varying the speed of the plurality of cooling fans.

Advantageously, this embodiment may be applied to Small Drive (SD) generators.

It should be noted that embodiments of the invention have been described with reference to different subject matters. In particular, some embodiments have been described with reference to method type claims whereas other embodiments have been described with reference to apparatus (control unit) type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of embodiments of the present invention are apparent from the examples of embodiment to be described hereinafter and are explained with reference to the examples of embodiment. The following will be described in more detail hereinafter with reference to examples of embodiment but to which the following is not limited.

BRIEF DESCRIPTION

Some of the embodiments will be described in detail, with references to the following Figures, wherein like designations denote like members, wherein:

FIG. 1 shows a schematic cross section of an exemplary electric generator included in a wind turbine, which is operated according to the cooling method of embodiments of the present invention; and FIG. 2 shows a block diagram, illustrating the method of embodiments of the present invention.

DETAILED DESCRIPTION

FIG. 1 shows a schematic cross section of an exemplary electric generator 1 of wind turbine (not shown as a whole). The electric generator 1 comprises a stator 2, a rotor 3 and a plurality of cooling fans 41, 42. In the shown embodiment of FIG. 1 the electric generator 1 comprises two cooling fans 41, 42. According to other possible embodiments, the electric generator 1 comprises a different number of cooling fans.

The electric generator 1 is included in a wind turbine (not represented as a whole).

The stator 2 extends along and around a rotational axis x of the wind turbine. With respect to the rotational axis x, the stator 2 extends:

axially between a first axial end 12 and a second axial end 13;

radially between an inner circumferential surface 14 and an outer circumferential surface 15.

Close to the outer circumferential surface 15, the stator 2 includes a plurality of windings 17, connected, at the axial ends 12, 13, by a plurality of end windings 18.

The rotor 3 surrounds the stator 2 and includes a plurality of permanent magnets 19, separated from the outer circumferential surface 15 of the stator 2 by a rotor stator gap 5. A bearing 10 is mounted between the rotor 3 and the stator 2 for allowing the rotation of the rotor around the rotational axis x.

In their active state the cooling fans 41, 42 cause air flows F1, F2 through a rotor stator gap 5 between said rotor 3 and said stator 2 and through stator gaps 6 between axially adjacent segments 7 of said stator 2, wherein the air flows F1, F2 are directed through the stator gaps 6 in the same direction. In their active state, the cooling fans 41, 42 generate air flows F1, F2 through the electric generator 1 for cooling the end windings 18 and the permanent magnets 19.

The electric generator 1 further includes at least a first temperature sensor 51 associated to the end windings 18 and a second temperature sensor 52 associated to the permanent magnets 19. The first and the second temperature sensor 51, 52 are connected to a control unit 53 of the electric generator 1, which operates the cooling fans 41, 42 for cooling the end windings 18 and the permanent magnets 19 preventing them to reach a first maximum acceptable temperature T1 and a second maximum acceptable temperature T2, respectively.

The first maximum acceptable temperature T1 has a value comprised between 40° C. and 100° C. The second maximum acceptable temperature T2 has a value comprised between 120° C. and 180° C.

According to other possible embodiments the first maximum acceptable temperature T1 and the second maximum acceptable temperature T2 have different values, but the first maximum acceptable temperature T1 is normally greater than the second maximum acceptable temperature T2.

The control unit 53 of the electric generator 1 operates the cooling fans 41, 42 according to the method 100, as represented in the block diagram of FIG. 2. The method 100 includes a first step 110 of monitoring the temperatures of the end windings 18 and of the permanent magnets 19 through the first and second temperature sensors 51, 52, respectively.

In a second step 120 of the method 100 it is checked if the temperatures of the end windings 18 and/or of the permanent magnets 19 rise reaches a first upper temperature limit L1. The first upper temperature limit L1 may be a limit which is set for the temperature of the end windings 18 or for the temperature of the permanent magnets 19.

If the first upper temperature limit L1 is not reached, the method 100 continues performing again the first step 110, i.e. monitoring the temperatures of the end windings 18 and of the permanent magnets 19.

If the first upper temperature limit L1 is instead reached, the method 100 continues performing a third step 130, in which the control unit 53 operates the plurality of cooling fans 41, 42 for generating the air flows F1, F2 and providing a first cooling power W1 to the electric generator 1, in particular to the end windings 18 and the permanent magnets 19.

In a fourth step 140 of the method 100 it is checked if, while the first cooling power W1 is provided, the temperature of the permanent magnets 19 reaches the second maximum acceptable temperature T2 while, at the same time, the temperature of the end windings 18 is lower than the first maximum acceptable temperature T1.

If the conditions at the previous fourth step 140 of the method are verified, the method 100 continues with a fifth step 150 in which the control unit 53 operates the plurality of cooling fans 41, 42 for modifying the air flows F1, F2 for providing a second cooling power W2 to the electric generator 1, to the end windings 18 and the permanent magnets 19. The second cooling power W2 is set to be lower than the first cooling power W1, to allow the end windings 18 to be cooled down without raising the temperature of the permanent magnets 19. In a possible embodiment of the present t invention, during the fifth step 150, the temperature of the air flows F1, F2 is comprised between the first maximum acceptable temperature T1 and the second maximum acceptable temperature T2. This condition max be reached, for example, when the ambient temperature around the electric generator 1 is high.

If the conditions at the previous fourth step 140 of the method are not verified, the method 100 continues with a sixth step 150 in which it is checked if, while the first cooling power W1 is provided, the temperatures of the end windings 18 and/or of the magnet 18 continue to rise while remaining both lower than the first and second maximum acceptable temperatures T1, T2, respectively.

If this condition is verified, the method 100 continues with a seventh step 170 in which the control unit 53 operates the plurality of cooling fans 41, 42 for modifying the air flows F1, F2 for providing a third cooling power W3 to the electric generator 1, to the end windings 18 and the permanent magnets 19. The third cooling power W3 is set to be greater than the first cooling power W1, to allow both the end windings 18 and the permanent magnets 19 to be cooled down.

If the conditions at the previous sixth step 160 of the method 100 are not verified, the method 100 continues performing again the third step 130, i.e. continuing to provide the first cooling power W1.

In an eighth step 180 of the method 100, which follows the fifth or the seventh step 170, it is checked if the temperatures of the end windings 18 reach the first maximum acceptable temperature T1. If such condition is reached, the cooling provided by the cooling fans 41, 42 is no more effective and the method has to continue with a final ninth step 190 in which the electric generator 1 is derated, i.e. the electrical power produced by the electric generator 1 has to be reduced, in order to allow both the end windings 18 and the permanent magnets 19 to be cooled down.

If the condition at the previous ninth step 190 of the method 100 is not verified, the method 100 continues performing again the seventh step 170, i.e. continuing to provide the third cooling power W3.

According to two possible embodiments of the present invention, the control unit 53 may operate the cooling fans 41, 42 to generate the first cooling power W1, the second cooling power W2 and the third cooling power W3, in two different ways, respectively, depending on the type of the electric generator 1:

if the electric generator 1 is of the large drive (LD) type, the plurality of cooling fans are operated by switching on/off a portion of them. Therefore, for generating the first cooling power W1 only a respective first portion of the cooling fans are switched on, for generating the second cooling power W2 part of such first portion of the cooling fans are switched off and, for generating the third cooling power W3 all the cooling fans are switched on;

if the electric generator 1 is of the small drive (SD) type (for example, like the one of the attached FIG. 1), the plurality of cooling fans 41, 42 are operated by varying the speed of the plurality of cooling fans. Therefore, for generating the first cooling power W1 the cooling fans 41, 42 are operated at a first speed, for generating the second cooling power W2 the cooling fans 41, 42 are operated at a second speed, lower than the first speed and, for generating the third cooling power W3, the cooling fans 41, 42 are operated at a third maximum speed.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for cooling an electric generator comprising
a stator including a plurality of windings and at least an end winding associated to a first temperature sensor, the end winding being operatable up to a first maximum acceptable temperature,
a rotor including at least a magnet associated to a second temperature sensor, the magnet being operatable up to a second maximum acceptable temperature,
one or more cooling fans, which in their active state generate air flows through the electric generator, for cooling the end winding and the magnet,
wherein the method includes the steps of:
monitoring the temperatures of the end winding and of the magnet through said first and second temperature sensors,
if the temperature of the end winding and/or of the magnet rises and reaches a first upper limit, operating the plurality of cooling fans for providing a first cooling power to the electric generator,
if, while the first cooling power is provided, the temperature of the magnet reaches the second maximum acceptable temperature and the temperature of the end winding is lower than the first maximum acceptable temperature, operating the plurality of cooling fans for providing a second cooling power to the electric generator, the second cooling power being lower than the first cooling power.

2. The method as claimed in claim 1, comprising the further step of:
if, while the first cooling power is provided, the temperatures of the end winding and/or of the magnet continue to rise and are both lower than the first and second maximum acceptable temperatures, respectively, operating the plurality of cooling fans for providing a third cooling power to the electric generator, the third cooling power being higher than the first cooling power.

3. The method as claimed in claim 1, comprising the further step of:
if the temperature of the end winding reaches the first maximum acceptable temperature, derating the electric generator.

4. The method as claimed in claim 1, wherein the plurality of cooling fans are operated for generating the first cooling power, the second cooling power and the third cooling power, by switching on/off a portion of the plurality of cooling fans.

5. The method as claimed in claim 1, wherein the plurality of cooling fans are operated for generating the first cooling power, the second cooling power and the third cooling power, by varying the speed of the plurality of cooling fans.

6. A control unit for an electric generator including a software program or product for executing the method of claim 1, when the software program or product is run on the control unit.

\* \* \* \* \*